(12) United States Patent
Sun et al.

(10) Patent No.: US 12,494,672 B2
(45) Date of Patent: Dec. 9, 2025

(54) RECHARGEABLE ENDOSCOPE ASSEMBLY

(71) Applicant: Zhengzhou Runde Dellonscope Co., Ltd, Zhengzhou (CN)

(72) Inventors: Jingzhao Sun, Zhengzhou (CN); Jinhui Luo, Zhengzhou (CN); Qi Zhang, Zhengzhou (CN); Guangliang Liu, Zhengzhou (CN); Chao Li, Zhengzhou (CN)

( * ) Notice: Subject to any disclaimer, the term of this patent is extended or adjusted under 35 U.S.C. 154(b) by 772 days.

(21) Appl. No.: 17/693,447

(22) Filed: Mar. 14, 2022

(65) Prior Publication Data

US 2022/0200341 A1    Jun. 23, 2022

(30) Foreign Application Priority Data

Oct. 28, 2021    (CN) .......................... 202122606826.0

(51) Int. Cl.
   *H02J 50/00*    (2016.01)
   *G02B 23/24*    (2006.01)
   *H02J 7/00*    (2006.01)

(52) U.S. Cl.
   CPC ........ *H02J 50/005* (2020.01); *G02B 23/2476* (2013.01); *H02J 7/0045* (2013.01)

(58) Field of Classification Search
   CPC .................................................. H02J 50/005

USPC .......................................................... 320/108
See application file for complete search history.

(56) References Cited

U.S. PATENT DOCUMENTS

| 2017/0012458 | A1 | 1/2017 | Song et al. | |
| 2017/0063139 | A1 | 3/2017 | Chang et al. | |
| 2019/0123585 | A1* | 4/2019 | Yang | H02J 50/90 |
| 2020/0076222 | A1* | 3/2020 | Yang | H02J 7/02 |
| 2020/0076249 | A1* | 3/2020 | Mao | H04B 5/79 |
| 2020/0083726 | A1* | 3/2020 | Kim | H02J 7/0044 |

FOREIGN PATENT DOCUMENTS

WO    WO2020/148725    *    7/2020

* cited by examiner

*Primary Examiner* — Yalkew Fantu
(74) *Attorney, Agent, or Firm* — Zhigang Ma

(57) ABSTRACT

The present disclosure provides a novel wireless charging device, and belongs to the technical field of industrial endoscopes. The novel wireless charging device includes a base, an endoscope body, and a shell fixedly mounted at one end of the endoscope body; one side of an upper surface of the base is fixedly connected with a bracket; a top end of the bracket is fixedly connected with a U-shaped clamping seat; the endoscope body is clamped on an inner wall of the U-shaped clamping seat; and the other side of the upper surface of the base is fixedly connected with a charging seat.

7 Claims, 5 Drawing Sheets

RECHARGEABLE ENDOSCOPE ASSEMBLY

TECHNICAL FIELD

The present disclosure belongs to the technical field of industrial endoscopes, specifically to a novel wireless charging device.

BACKGROUND

An endoscope is a multi-disciplinary universal tool. Its function is to explore a deep part of a curved pipe, which can observe parts that cannot be seen directly, observe an internal space structure and state in a sealed cavity, and achieve long-distance observation and operation. Due to its special size design, an industrial endoscope can allow people to observe internal surface structures or working states of objects easily and accurately without destroying the surfaces of the detected objects. For non-destructive detection, the industrial endoscope is used as a detection tool and is specially designed and produced for a complicated industrial use environment. Endoscope detection is a detection technology that has gradually been widely used with the development of an endoscope manufacturing technology. The industrial endoscope is mainly used for automobiles, aero-engines, pipelines, mechanical parts, etc. Non-destructive detection can be achieved without disassembling or destroying subassemblies and stopping the operation of equipment. The endoscope is widely used in various departments of modern core industries such as aviation, automobiles, ships, electrics, chemistry, electricity, gas, atomic energy and civil construction.

At present, when a traditional industrial endoscope is used, it is usually charged by wired charging. The charging operation is troublesome and wastes the working time of working staff. Moreover, safe placement of equipment cannot be guaranteed during charging. It is easy to cause bump damage and increase the use cost. In addition, when a plurality of sets of equipment are charged, it is easy to cause messy placement, which brings inconvenience to charging and use. At the same time, the messy placement of charging cables is likely to cause safety hazards, which cannot effectively adapt to a production and machining environment and has high usage limitations.

SUMMARY

The present disclosure aims to provide a novel wireless charging device, and aims to solve the problems of troublesome charging operation, low efficiency, and low charging and use safety in the prior art.

In order to achieve the above objective, the present disclosure provides the following technical solution: A novel wireless charging device includes a base, an endoscope body, and a shell fixedly mounted at one end of the endoscope body; one side of an upper surface of the base is fixedly connected with a bracket; a top end of the bracket is fixedly connected with a U-shaped clamping seat; the endoscope body is clamped on an inner wall of the U-shaped clamping seat; the other side of the upper surface of the base is fixedly connected with a charging seat; one end of the shell is clamped on the inner wall of the charging seat; an energy supply device is arranged inside the charging seat; a bottom end of the shell is provided with a cavity; an energy storage device is arranged inside the cavity; a mounting slot is arranged on an inner wall of the shell close to the cavity; a control device is arranged in the mounting slot.

In order to enable the novel wireless charging device to achieve an effect of guaranteeing the power supply stability, as a preference of the present disclosure, the energy supply device includes a charging interface and a wireless charging transmitting end; the charging interface is fixedly mounted at a bottom end of the bracket; the wireless charging transmitting end is fixedly mounted inside the charging seat through a bolt; the charging interface is electrically connected to the wireless charging transmitting end.

In order to enable the novel wireless charging device to achieve an effect of guaranteeing the power supply stability, as a preference of the present disclosure, the energy storage device includes a storage battery and a wireless charging receiving end adapting to the wireless charging transmitting end; the storage battery is fixedly mounted in the cavity through a mounting bar; the wireless charging receiving end is fixedly mounted on an inner side wall of the cavity through a bolt; the wireless charging receiving end is electrically connected to the storage battery.

In order to enable the novel wireless charging device to achieve an effect of guaranteeing the power supply stability, as a preference of the present disclosure, the control device includes a charging management module and a control switch electrically connected to the charging management module; the control switch is fixedly mounted on an inner top wall of the mounting slot; the charging management module is fixedly mounted on an inner bottom wall of the mounting slot through a bolt; the charging management module is electrically connected to the wireless charging receiving end.

In order to enable the novel wireless charging device to achieve an effect of guaranteeing the power supply stability, as a preference of the present disclosure, a heat dissipation strip is arranged on an upper surface of the base; a heat conduction plate is fixedly mounted on an outer surface of the base close to the heat dissipation strip.

In order to enable the novel wireless charging device to achieve an effect of guaranteeing the power supply stability, as a preference of the present disclosure, an antiskid foot pad is fixedly mounted at an edge of a lower surface of the base; the number of antiskid foot pads is at least two; the antiskid foot pads are uniformly arranged at the edge of the lower surface of the base.

Compared with the existing art, the present disclosure has the beneficial effects:

1. According to the novel wireless charging device, during charging, the base is placed at a proper position according to a requirement of a use environment; the endoscope body is then clamped in the U-shaped clamping seat of the bracket to ensure the safety of the placement of the endoscope body; one end of the shell is placed in the charging seat, which can stably place equipment to avoid damage caused by bump and ensure the charging safety; the power supply device is turned on via the control device in the mounting slot; charging is performed by cooperation with the energy storage device in a cavity, which achieves wireless charging for the endoscope; the charging device is small and flexible, and it is simpler and more convenient to charge and use; the charging device can flexibly adapt to various production and machining charging environment; waste of time of working staff by complicated operations is avoided; it is favorable for improving the working efficiency of the working staff and simplifying the working content; at the same time, the potential safety hazard caused by messy placement during charging is avoided; it is favorable for improving the safety of use; the practicability is higher.

2. According to the novel wireless charging device, after the charging interface is electrically connected to the wireless charging transmitting end, which can provide stable electric energy for the wireless charging transmitting end to ensure the timeliness and stability of wireless charging and use; the electric energy can be quickly conveyed and stored to the storage battery via energy transportation of the wireless charging transmitting end and the wireless charging receiving end, so as to ensure power supplying and use; during wireless charging, heat is conveyed, via the heat conduction plate, to the heat dissipation strip for dissipation to the outside; the potential safety hazard caused by an extremely high temperature during charging can be avoided; it is favorable for improving the safety of use; the base can be stably supported and placed via the at least two antiskid foot pads, which ensures the safety during wireless charging and avoids the damage caused by bump; it is more convenient to move and use.

BRIEF DESCRIPTION OF THE DRAWINGS

The accompanying drawings are used to provide a further understanding of the present disclosure and constitute a part of this specification to explain the present disclosure together with the embodiments of the present disclosure, and do not constitute restrictions to the present disclosure. In the drawings.

Figure 1:
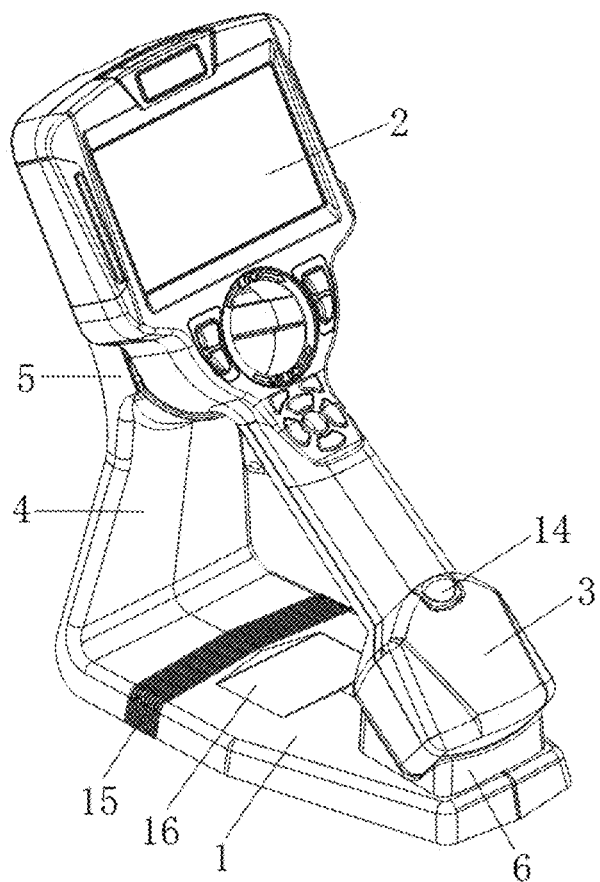
FIG. 1 is a schematic diagram of a front-view structure in a specific embodiment of the present disclosure.

In the drawings: 1: base; 2: endoscope body; 3: shell; 4: bracket; 5: U-shaped clamping seat; 6: charging seat; 7: cavity; 8: mounting slot; 9: charging interface; 10: wireless charging transmitting end; 11: storage battery; 12: wireless charging receiving end; 13: charging management module; 14: control switch; 15: heat dissipation strip; 16: heat conduction plate; 17: antiskid foot pad.

DETAILED DESCRIPTION OF THE EMBODIMENTS

The technical solutions in the embodiments of the present disclosure will be described clearly and completely below with reference to the drawings in the embodiments of the present disclosure. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

Figure 2:
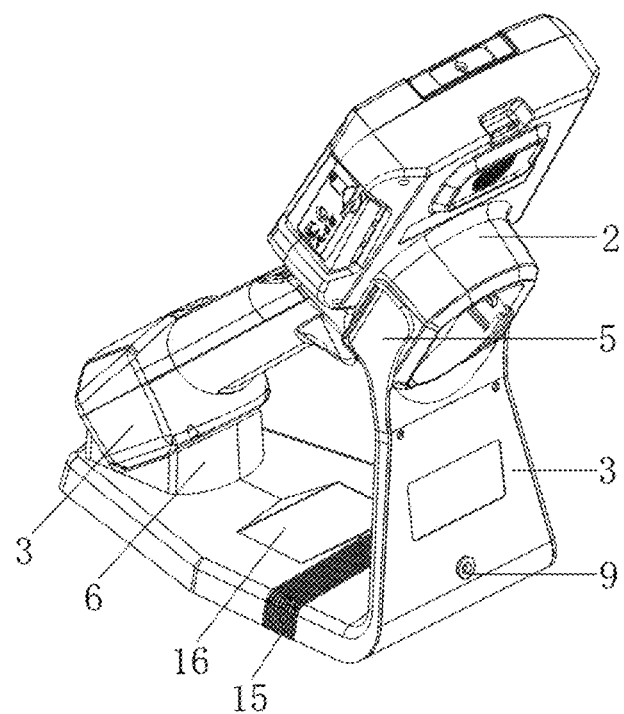
FIG. 2 is a schematic diagram of a rear-view structure in a specific embodiment of the present disclosure.
Figure 3:
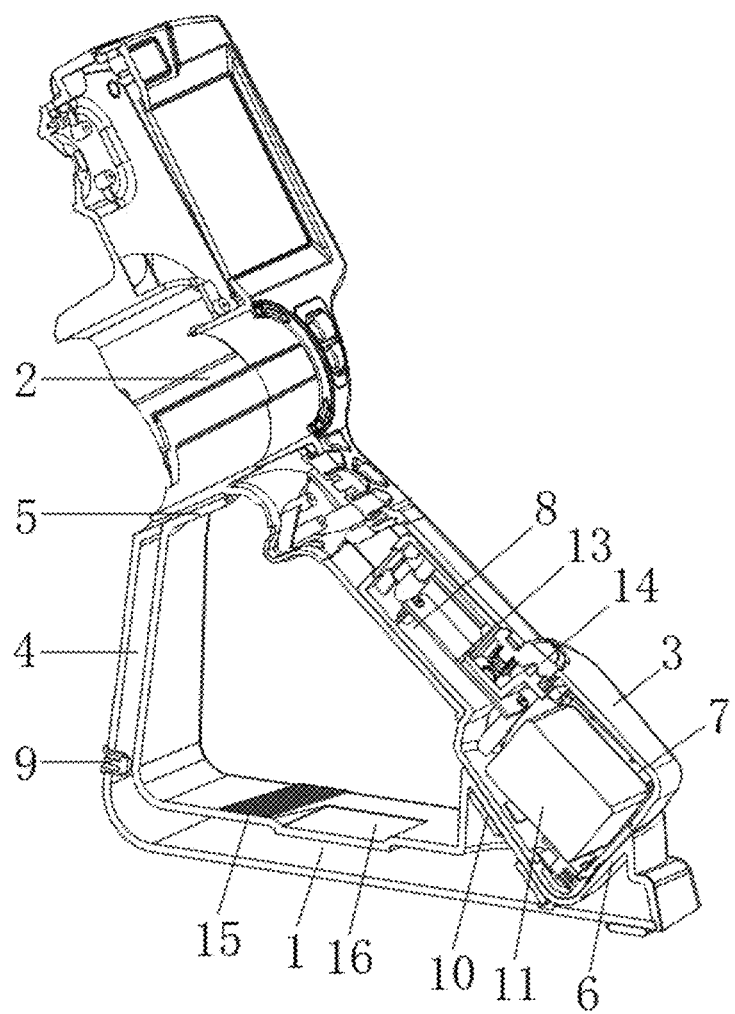
FIG. 3 is a schematic diagram of a front-view sectional structure in a specific embodiment of the present disclosure.
Figure 4:
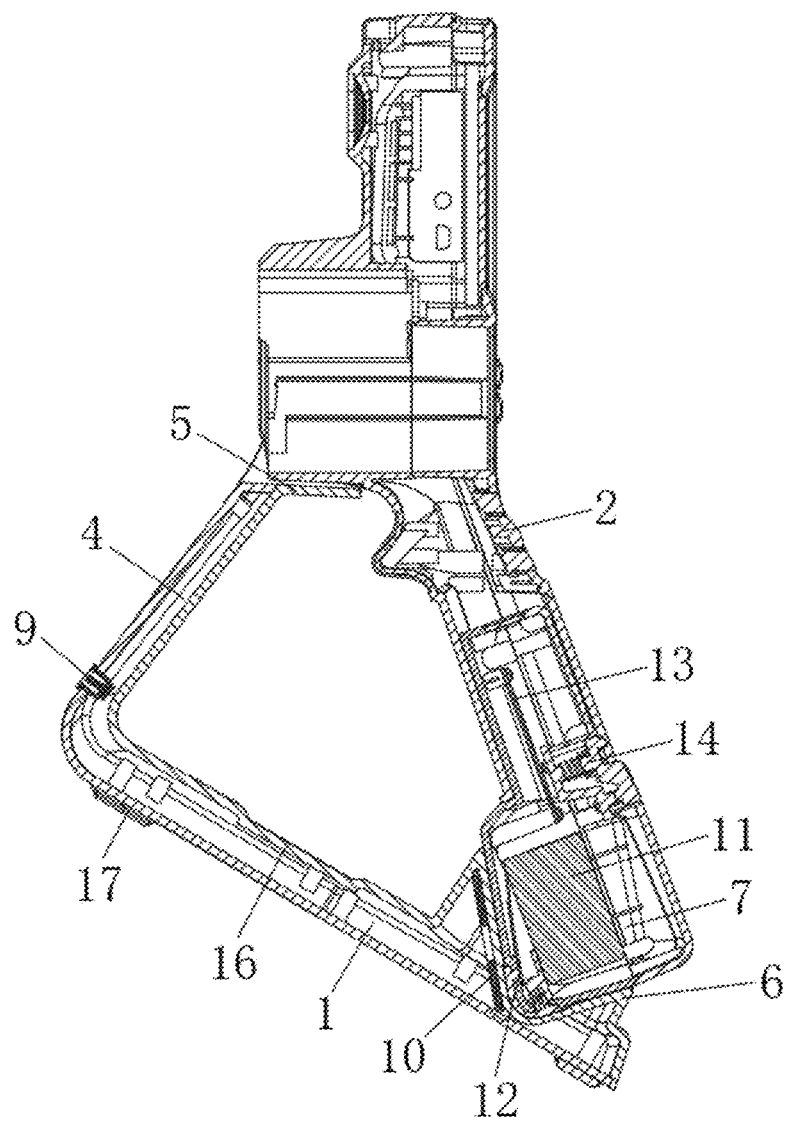
FIG. 4 is a schematic diagram of a front-view planar structure in a specific embodiment of the present disclosure.
Figure 5:
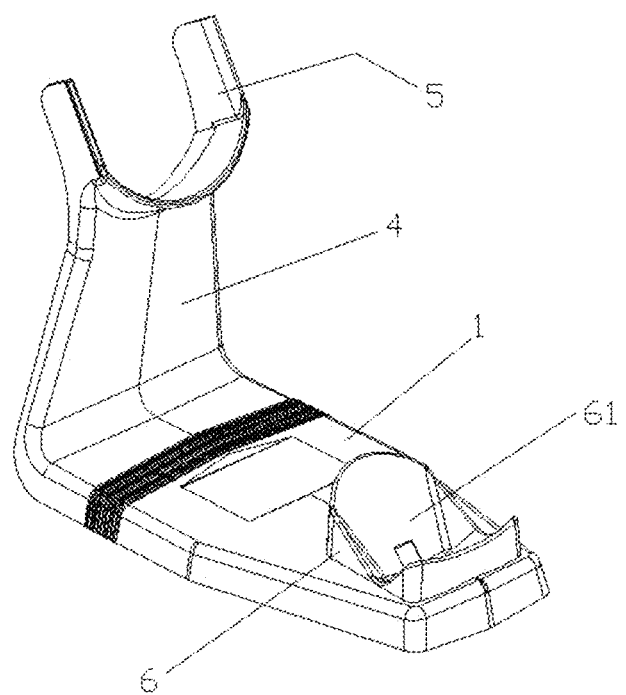
FIG. 5 shows the wireless charging device in a specific embodiment of the present disclosure.

Referring to FIGS. 1-5, the present disclosure provides the following technical solution: A novel wireless charging device includes a base 1, an endoscope body 2, and a shell 3 fixedly mounted at one end of the endoscope body 2; one side of an upper surface of the base 1 is fixedly connected with a bracket 4; a top end of the bracket 4 is fixedly connected with a U-shaped clamping seat 5; the endoscope body 2 is clamped on an inner wall of the U-shaped clamping seat 5; the other side of the upper surface of the base 1 is fixedly connected with a charging seat 6; one end of the shell 3 is clamped on a V-shaped recess 61 of the charging seat 6; an energy supply device is arranged inside the charging seat 6; a bottom end of the shell 3 is provided with a cavity 7; an energy storage device is arranged inside the cavity 7; a mounting slot 8 is arranged on an inner wall of the shell 3 close to the cavity 7; a control device is arranged in the mounting slot 8.

In the specific embodiment of the present disclosure, during charging, the base 1 is placed at a proper position according to a requirement of a use environment; the endoscope body 2 is then clamped in the U-shaped clamping seat 5 of the bracket 4 to ensure the safety of the placement of the endoscope body 2; one end of the shell 3 is placed in the charging seat 6, which can stably place equipment to avoid damage caused by bump and ensure the charging safety; the power supply device is turned on via the control device in the mounting slot 8; charging is performed by cooperation with the energy storage device in a cavity 7, which achieves wireless charging for the endoscope; the charging device is small and flexible, and it is simpler and more convenient to charge and use; the charging device can flexibly adapt to various production and machining charging environment; waste of time of working staff by complicated operations is avoided; it is favorable for improving the working efficiency of the working staff and simplifying the working content; at the same time, the potential safety hazard caused by messy placement during charging is avoided; it is favorable for improving the safety of use; the practicability is higher.

Specifically, the energy supply device includes a charging interface 9 and a wireless charging transmitting end 10; the charging interface 9 is fixedly mounted at a bottom end of the bracket 4; the wireless charging transmitting end 10 is fixedly mounted inside the charging seat 6 through a bolt; the charging interface 9 is electrically connected to the wireless charging transmitting end 10. After the charging interface 9 is electrically connected to the wireless charging transmitting end 10, stable electric energy can be provided for the wireless charging transmitting end 10 to ensure the timeliness and stability of wireless charging and use.

Specifically, the energy storage device includes a storage battery 11 and a wireless charging receiving end 12 adapting to the wireless charging transmitting end 10; the storage battery 11 is fixedly mounted in the cavity 7 through a mounting bar; the wireless charging receiving end 12 is fixedly mounted on an inner side wall of the cavity 7 through a bolt; the wireless charging receiving end 12 is electrically connected to the storage battery 11. The electric energy can be quickly conveyed and stored to the storage battery 11 via energy transportation of the wireless charging transmitting end 10 and the wireless charging receiving end 12, so as to ensure power supplying and use and avoid the potential safety hazard caused by charging; it is more convenient to use.

Specifically, the control device includes a charging management module 13 and a control switch 14 electrically connected to the charging management module 13; the control switch 14 is fixedly mounted on an inner top wall of the mounting slot 8; the charging management module 13 is fixedly mounted on an inner bottom wall of the mounting slot 8 through a bolt; the charging management module 13 is electrically connected to the wireless charging receiving end 12. The wireless charging process can be timely and stably controlled via the charging management module 13; at the same time, it is more convenient and efficient to operate and control equipment via the control switch 14, so that the working time of working staff is saved, and the working efficiency is improved.

Specifically, a heat dissipation strip 15 is arranged on an upper surface of the base 1; a heat conduction plate 16 is fixedly mounted on an outer surface of the base 1 close to the heat dissipation strip 15. During wireless charging, heat is conveyed, via the heat conduction plate 16, to the heat dissipation strip 15 for dissipation to the outside; the potential safety hazard caused by an extremely high temperature during charging can be avoided; it is favorable for improving the safety of use.

Specifically, an antiskid foot pad 17 is fixedly mounted at an edge of a lower surface of the base 1; the number of antiskid foot pads 17 is at least two; the antiskid foot pads 17 are uniformly arranged at the edge of the lower surface of the base 1. The base 1 can be stably supported and placed via the at least two antiskid foot pads 17, which ensures the safety during wireless charging and avoids the damage caused by bump; it is more convenient to move and use.

It should be noted that

Mechanical structures and working principles of the endoscope body 2, the charging interface 9, the wireless charging transmitting end 10, the wireless charging receiving end 12, the charging management module 13, and the control switch 14 herein all belong to the prior art, so that their detailed mechanical structures and working principles are not described herein.

The electrical components herein are electrically connected with an external main controller and 220V mains supply, and the main controller can be a computer or other conventional known equipment that plays a control role.

In the description of the present disclosure, unless otherwise explicitly defined and defined, the terms "installed", "coupled" and "connected" shall be understood broadly, and may be, for example, fixedly connected, or detachably connected, or integrally connected, or mechanically connected, or electrically connected, or directly connected, or indirectly connected through an intermediate medium, or interconnection between two elements. Those of ordinary skill in the art can understand the specific meanings of the above terms in the present disclosure according to specific situations.

For those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure. No drawing markings in claims shall be deemed to limit the claims involved.

In addition, it should be understood that although the present specification is described in accordance with the implementation modes, and each implementation mode does not only contain one independent technical solution. This narration in the specification is only for clarity. Those skilled in the art should regard the specification as a whole. The technical solutions in all the embodiments can also be appropriately combined to form other implementation modes that can be understood by those skilled in the art.

What is claimed is:

1. A rechargeable endoscope assembly, comprising a base (1), an endoscope body (2), and a shell (3) fixedly mounted at one end of the endoscope body (2), wherein one side of an upper surface of the base (1) is fixedly connected with a bracket (4); a top end of the bracket (4) opposite to the base (1) is fixedly connected with a U-shaped clamping seat (5) configured to clamp another end of the endoscope body (2); another side of the upper surface of the base (1) is fixedly connected with a charging seat (6); the charging seat (6) defines a V-shaped recess configured to clamp one end of the shell (3) opposite to the endoscope body (2); the endoscope body (2) together with the shell (3) is configured to be removably disposed on the bracket (4) and the charging seat (6), the endoscope body (2) together with the shell (3), the bracket (4), the base (1) and the charging seat (6) are configured to be connected to form a substantially right-angled triangle structure with the endoscope body (2) together with the shell (3) disposed at a hypotenuse of the triangle structure, an energy supply device is arranged inside the charging seat (6); a bottom end of the shell (3) is provided with a cavity (7); an energy storage device is arranged inside the cavity (7); a mounting slot (8) is arranged on an inner wall of the shell (3) close to the cavity (7); a control device is arranged in the mounting slot (8) and the control device is configured to control the energy supply device in the charging seat (6) to charge the energy storage device in the cavity (7) when the shell (3) is clamped on the charging seat (6).

2. The according to claim 1, wherein the energy supply device comprises a charging interface (9) and a wireless charging transmitting end (10); the charging interface (9) is fixedly mounted at a bottom end of the bracket (4); the wireless charging transmitting end (10) is fixedly mounted inside the charging seat (6) through a bolt; the charging interface (9) is electrically connected to the wireless charging transmitting end (10).

3. The rechargeable endoscope assembly according to claim 2, wherein the energy storage device comprises a storage battery (11) and a wireless charging receiving end (12) adapting to the wireless charging transmitting end (10); the storage battery (11) is fixedly mounted in the cavity (7) through a mounting bar; the wireless charging receiving end (12) is fixedly mounted on an inner side wall of the cavity (7) through a bolt; the wireless charging receiving end (12) is electrically connected to the storage battery (11).

4. The rechargeable endoscope assembly according to claim 3, wherein the control device comprises a charging management module (13) and a control switch (14) electrically connected to the charging management module (13); the control switch (14) is fixedly mounted on an inner top wall of the mounting slot (8); the charging management module (13) is fixedly mounted on an inner bottom wall of the mounting slot (8) through a bolt; the charging management module (13) is electrically connected to the wireless charging receiving end (12).

5. The rechargeable endoscope assembly according to claim 1, wherein a heat dissipation strip (15) is arranged on an upper surface of the base (1); a heat conduction plate (16) is fixedly mounted on an outer surface of the base (1) close to the heat dissipation strip (15).

6. The rechargeable endoscope assembly according to claim 1, wherein an antiskid foot pad (17) is fixedly mounted at an edge of a lower surface of the base (1); the number of antiskid foot pads (17) is at least two; the antiskid foot pads (17) are uniformly arranged at the edge of the lower surface of the base (1).

7. A wireless charging device for endoscope assembly, comprising a base (1), wherein one side of an upper surface of the base (1) is fixedly connected with a bracket (4), a top end of the bracket (4) opposite to the base (1) is fixedly connected with a U-shaped clamping seat (5); another side of the upper surface of the base (1) is fixedly connected with a charging seat (6), and the bracket (4) and the base (1) cooperatively form a substantially L-shaped structure, with the clamping seat (5) and the charging seat (6) located on two ends of the L-shaped structure;

the charging seat (6) defines a V-shaped recess (61), the clamping seat (5) and the V-shaped recess (61) are configured to removably clamp two ends of the endoscope assembly, with the endoscope assembly leaned against on a hypotenuse of the L-shaped structure to allow the endoscope assembly balances the L-shaped structure, thereby the endoscope assembly and the L-shaped structure cooperatively forming a triangle balancing structure, and the charging seat (6) is configured to be coupled to a wireless charging receiving end of the endoscope assembly to charge the endoscope assembly.

\* \* \* \* \*